A. H. Burdine.
Sharpening Reciprocating Saws.
N° 20,933. Patented July 20, 1858.
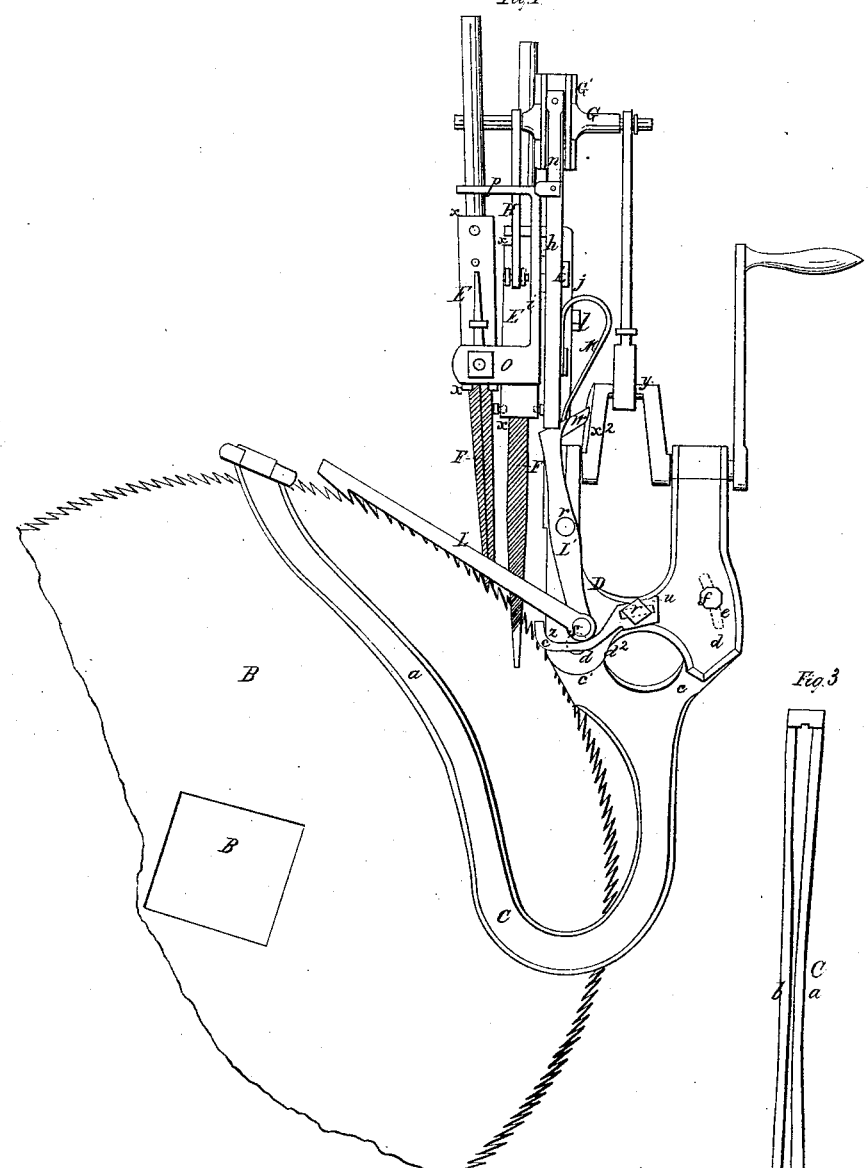
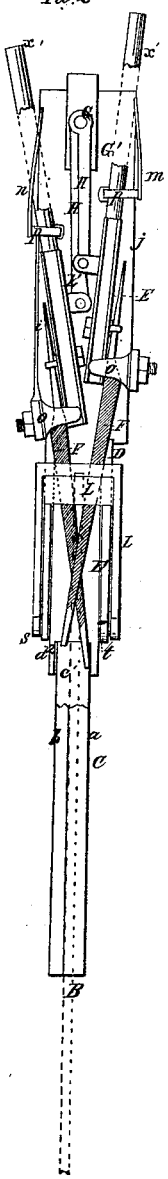
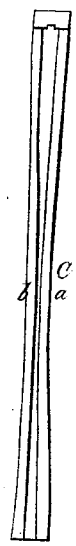

UNITED STATES PATENT OFFICE.

A. H. BURDINE, OF CHULAHOMA, MISSISSIPPI.

MACHINE FOR SHARPENING GIN-SAWS.

Specification of Letters Patent No. 20,933, dated July 20, 1858.

*To all whom it may concern:*

Be it known that I, A. H. BURDINE, of Chulahoma, in the county of Marshall and State of Mississippi, have invented a new and useful Machine for Sharpening Old Cotton-Gin Saws; and I do hereby declare that the following is a full, clear, and exact description of the same, reference being had to the accompanying drawings, forming a part of this specification, in which—

Figure 1, is a side view of the machine constructed with my improvements. Fig. 2, is a front view of the same. Fig. 3, is a front view of the saw clamp detached from the machine.

Similar letters of reference, in each of the several figures indicate corresponding parts.

The principal object of my invention is to provide a machine which will conveniently answer for sharpening old cotton gins without the necessity of removing the saws from the gin frames.

The nature of my invention consists, 1st, in the combination with a frame which is capable of fitting over and sustaining itself upon the saw, of two pivoted spring file frames, furnished with files, one arranged diagonally across and slightly in advance of the other, and with an automatic feeding pawl. The said parts being arranged in such relation to each other that the whole shall be operated by the turning of one shaft. 2nd. In feeding the gin saws around to the action of the files by their own teeth, as hereinafter specified. 3rd. In having the lower or clamping part of the frame pivoted to the upper part, and adjustable in the path of a circle, in the manner hereinafter specified; so that the feeding pawl shall be capable of feeding saws which have teeth of a greater or less angle. 4th. In making the feeding pawl adjustable in the manner hereinafter specified, so as to be capable of feeding saws which have teeth of a greater or less length.

To enable others, skilled in the art, to make and use my invention, I will proceed to describe its construction and operation.

A, in the accompanying drawing, represents an old gin shaft and B, the gin saws secured on the same. The shaft and saws are supposed to be fitted on a cotton gin frame so as to be capable of revolving as usual.

C, D, represent a frame for containing and suporting all of the parts composing the sharpening machine. The lower part C, of this frame consists simply of a curved bracket which is slit through from front to rear in the manner shown in Fig. 3, or so that the metal *a*, *b*, on the opposite sides of the slit shall form spring clamping jaws, which, when the machine is placed on the saw in the manner shown in black in Fig. 1, and in red in Fig. 2, will bind or bite near the center of their length with a yielding force upon the two sides of the saw and thus support the machine upon the saw without its being permanently fastened to the gin frame. This arrangement of clamping jaws enables me to make the machine much more portable and enables the operator to work with more expedition and convenience as such jaws are adapted by reason of their elasticity to all sizes and thicknesses of saws; whereas it is difficult when a machine has to be attached to gin frames to attach the machine firmly, and even at all, owing to the blocks of the shaft upon which the saws are hung very often being of different lengths. This clamping part of the frame is made forked at its upper end as shown at *c*, *c'*, and pivoted at *d*, to the lower forked end *d²*, of the upper or supporting part of the frame, and is made adjustable in the path of a circle by means of a curved slot *e*, and set screw *f*, the slot being formed in the forked projection *c*, and the set screw passing through said slot and through the forked projection *d'*, of the upper part of the frame.

The upper portion of the frame C, D, is forked at its top end as well as at its lower end. The longest prong *h*, has two file frames *i*, *j*, pivoted to it at *k*, *l*, as shown in the drawing, said frames being held in proper operative position by springs *m*, *n*, bearing against their upper end with a yielding pressure. The guides *o*, *p*, of these frames are so placed that the file stocks E, stand oblique or diagonal to, and slightly in advance of one another as shown.

E, E, are the file stocks. They are flat from *x*, to *x*, and round from *x*, to *x'*, the round part plays loosely in a hole of the upper guides, while the flat part is grooved on its edges and receives tongues formed on the lower guides.

F, F, are the files. They are secured to the stocks E, E, in the manner shown or otherwise so that one is slightly in advance of the other, and they cross each other diagonally, and one comes on one side of the saw and the other on the opposite side, as shown.

G, is a sliding shaft to which the file stocks are connected by pitmen H, H, as shown. This shaft moves up and down in a slot of the upper portion of the frame by means of a groove slide G', which is fitted to said slot and moved up and down by means of a pitman I, and crankwrist J, of the driving shaft K, as shown.

L, L', is a jointed feeding pawl; it stands over the slit of the clamping portion of the frame so as to take hold of the saw teeth as illustrated, being pivoted at $r$, to the upper portion of the frame and having the extent of its movement controlled at $s$, by means of an adjustable stop $t$, which is attached to the upper portion D, of the frame by means of slot $u$, and set screw $v$, in such a manner that it can be moved forward or backward and thus lengthen or shorten the extent of the movement of the feeding pawl. On the upper end of the lever part L', of the pawl an incline projection $w$, is formed so that the arm $x^2$, which carries the crank wrist $y$, shall come in contact with it in the revolution of said wrist and thereby operate the pawl so as to cause it to feed the saw around gradually by its own teeth.

M, is a spring for throwing the pawl lever back after the feeding of one tooth has been accomplished, ready to take another tooth of the saw, when the proper time for feeding the saw the distance of another tooth, arrives.

Instead of using a crank shaft as shown in the drawing for moving the feeding lever an eccentric may be employed. In this case the lever of the feeding pawl will be shaped so as to pass under the eccentric and be operated by means of a projection on the face of the same. It may also be found advantageous to gear up the machine in any ordinary way so as to have it work with greater speed.

This machine will file the teeth of old gin saws so that they have a gradual taper toward the front on both sides, which shape is found in practice to be the only proper one for such saws. The sharpening can be performed in the most perfect manner and with great expedition by the most ordinary operator. With one of these machines a whole gin can be sharpened in about two hours and at a comparatively triffling expense, whereas to do the same work by hand, two or three days would be required and the proprietor would have to pay $10 for the performance of the same which is nearly half as much as one of my machines could be purchased for.

What I claim as my invention and desire to secure by Letters Patent, is—

1. The arrangement of the adjustable feeding pawl L, L', spring file frames $i$, $j$, and slotted or jointed adjustable frame C, D, $b$, $a$, substantially as and for the purpose set forth.

2. The particular arrangement herein specified of the self clamping and self sustaining frame C, $a$, $b$, in combination with the pawl L, for the particular purpose of feeding old circular gin saws while on the shaft and in the grain frame, substantially as set forth.

3. The particular manner shown of arranging the clamping part C, of the frame, on the upper part D, of the frame for the purpose set forth.

A. H. BURDINE.

Witnesses:
G. YORKE ATLEE,
W. ATLEE.